Patented Dec. 27, 1949

2,492,510

UNITED STATES PATENT OFFICE 2,492,510

AMINO-ALDEHYDE ADHESIVES

Clarence F. Van Epps, Lockport, N. Y., assignor, by mesne assignments, to Monsanto Chemical Company, St. Louis, Mo., a corporation of Delaware No Drawing. Application April 24, 1945,
Serial No. 590,113

15 Claims. (Cl. 260—6)

The present invention relates to an improvement in thermosetting wheat flour-extended aqueous amino-aldehyde adhesives, particularly urea/formaldehyde and melamine/formaldehyde compositions and the like.

Adhesives of this character are used extensively, particularly in plywood manufacture, with the incorporation of a substantial amount of cereal flour, usually wheat flour, which enables the relatively expensive adhesive to be extended over a wide range with attendant cost reduction and little loss in the dry strength of the bond resulting from these adhesives. However, in this procedure, difficulty has been encountered in always obtaining a smooth spreadable mix, particularly when wheat flours of high gluten character are selected. When some varieties of soft wheat flours of low gluten character are used, this difficulty is less apparent or may even be absent, but, when bread flours or even many varieties of other wheat flours are substituted, there has been serious difficulty due to the mix either being curdy and thixotropic initially or, more frequently, a smooth spreadable mix is first obtained and, after varying periods, the objectionable curdy, thixotropic character develops and satisfactory distribution of the adhesive by the glue spreader becomes impossible.

A principal object of the present invention is the provision of new amino-aldehyde adhesives which may be extended with substantial amounts of wheat flours of any gluten strength to form glue bases capable of being compounded into spreadable, aqueous mixtures free from curdy and thixotropic characteristics. Further objects include:

(1) The provision of a process for the preparation of amino-aldehyde adhesives capable of being extended with wheat flours of appreciable gluten strength without imparting thereto undesirable thixotropic characteristics when compounded into spreadable, aqueous mixtures.

(2) The provision of new, modified amino-aldehyde compositions.

(3) The provision of new adhesive compositions especially suitable for use in plywood production.

(4) The provision of aminoplast containing adhesives comprising appreciable quantities of wheat flour of substantial gluten strength which may be compounded into spreadable, aqueous mixtures exhibiting no curdy and thixotropic characteristics.

(5) The provision of aminoplast adhesives which may be admixed with appreciable quantities of wheat flours to form glue bases without regard for the source and gluten character of the wheat flour.

(6) The provision of aminoplast containing glue-bases which possess less odor of formaldehyde during use.

Further objects and the entire scope of this invention will be apparent from the following detailed description.

These objects are accomplished according to the process of the present invention by incorporating and maintaining in an amino-aldehyde composition appreciable concentrations of bisulphite ions while the amino-aldehyde is in admixture with the wheat flour in the presence of appreciable amounts of water. The incorporation of the bisulphite-ion producing material into the mixture may be made at any stage up to and including the step of admixture of the glue-base with water to form a viscous, spreadable adhesive, i. e., the bisulphite-ion provider may be added to the amino-aldehyde material prior to addition of wheat-flour, after addition of wheat-flour in the dry state, or when the wheat-flour and amino-aldehyde composition is admixed with water.

In illustration of this procedure, it is found that the presence of at least 1% of sodium bisulphite, based on the content of wheat flour in the glue, produces a satisfactory free-flowing, non-curding, flour-extended adhesive, regardless of the character of the particular wheat flour used as the extender. Equivalent amounts of bisulphite ions are equally effective when derived from other salts and bisulphite ion-providing materials, e. g., ammonium bisulphite, aldehyde/bisulphite complexes, etc., although sodium bisulphite is the most economical to use. As long as an effective amount of the bisulphite ions is provided in the glue mixture, the stage at which the reagent is incorporated does not materially alter the final result.

With resin adhesives which are purchased in the form of a dry powder, it is a convenience and an economy for a user, e. g., a plywood manufacturer, to be able to use the most convenient local source of wheat flour and to vary the amount of flour extension at will according to the requirement of the particular substance being glued, e. g., the particular lot of plywood which is being made, and still be sure of getting a satisfactory spreadable adhesive. The ordinary amount of flour employed for extension is substantial and varies between a minimum of about 50 parts and a maximum of about 250 parts of flour for each 100 parts of dry, powdered, amino-aldehyde resin or its equivalent. To meet this requirement, I find that an entirely satisfactory adhesive base consists of a dry powdered resin containing about 3% of sodium bisulphite powder. This adhesive base will permit the user to employ the full range of flour dilution mentioned above and always have a sufficient bisulphite content to produce satisfactory glue, using as an extender varying amounts of wheat flour obtained from any convenient source.

It will be noted that this provides 1.2% of the bisulphite when the maximum of 250 parts of flour is added. It is understood, of course, that a still lower bisulphite content is also useful and may be adequate with some kinds of flour, but it appears that to meet all conditions a minimum of about 1% is desirable and that a considerable excess is not objectionable. For instance, with the minimum dilution of only 50 parts of flour, the bisulphite content with this glue base would be 6% of the flour which is also satisfactory.

The dry powdered glue base composition, which is shipped to the user, may also contain other catalytic, buffering and modifying agents, provided they are not of a nature to interfere with the essential pH control in the normal acid range between about pH 2.5 and pH 6.0. This procedure also permits the use of the usual hardeners and accelerators which are ordinarily added by the user when mixing the glue. The usual modifying agents, such as thiourea, phenol, resorcinol, soluble blood albumen, and the like (either as such or as resinous condensation products with aldehydes or co-reacted with the amino-aldehyde resin) as well as other aldehydes such as furfural and acetaldehyde may also be employed without interferring with the action of the bisulphite. In cases where the customer purchases or uses a liquid resin-providing adhesive base, it is also feasible to add bisulphite in similar proportion at any convenient stage.

While the useful effects of bisulphite ions in these flour adhesives have their greatest application in hot press adhesives, the same effects are also present and advantageous when the adhesive is converted by the well-known cold press method in which case acidic accelerators may be added to catalyze the adhesive in the more acid region of the pH range. While this pH adjustment shortens the glue life, it causes the adhesive to convert slowly at room temperature without requiring the accelerating effect of heat. In this case, a better effect is obtained if the flour, bisulphite and water are stirred together before the other elements are added which would give the final product a lower pH value. This method probably provides more bisulphite ions to act on the flour than if all the elements were mixed initially which would bring the pH below the point where maximum bisulphite ions are present.

I have found that, when an acid pH value of between 2.5 and 6.0 is maintained in an aqueous adhesive comprising a convertable amino-aldehyde composition admixed with wheat flour and containing a substantial amount of bisulphite ions, three effects are evident, i. e.: (1) the adhesive mixture is rendered non-curding and smooth-spreading and there is a very desirable and marked thinning effect, substantially reducing the water-requirement; (2) the reactivity is in the essential acid range for rapid hot press conversion; and (3) the objectionable odor of formaldehyde at the spreader is reduced.

The following examples illustrate the practice of my invention with various amino-aldehyde adhesives under a wide range of conditions. These examples are to be construed as illustrative and not in a limiting sense since it will be readily apparent to experts in the field of synthetic resin adhesives that the principle of my invention may be successfully applied under other conditions.

The usual technical grades of chemical materials such as urea, dimethylol urea, melamine, Formalin, and sodium bisulphite were used and the parts are given by weight. The extender was a wheat flour of high gluten character although it was a low grade and desirably inexpensive flour normally sold for export. This was chosen because it is typical and illustrative of high gluten flours in general which have hitherto been unsatisfactory because of their marked curding tendencies when used as extenders in these adhesives. Numerous other flours have been tested and, while a few varieties (apparently due to low gluten strength character) are comparatively free from these tendencies, the use of bisulphite ions in the pH range described in all cases has a useful thinning effect at a negligible cost and also reduces all of them to the desired non-curding character. As illustrated in several of the following examples, this useful effect is unexpectedly obtained regardless of the presence or absence of a large amount of free formaldehyde which often acts undesirably to curdle or gel aqueous wheat flour mixtures.

*Example I*

The following ingredients were employed in the production of an adhesive:

72 parts dry adhesive mixture containing 70 parts of spray dried urea/formaldehyde adhesive resin and 2 parts sodium bisulphite
200 parts flour
288 parts water About 200 parts of water were placed in a glue mixer. The dry ingredients were then added with the mixer running and stirred until smooth and free from lumps. The remainder of the water was then added and stirring continued until a uniform smooth mix was obtained. The glue was then ready for use. It had a pH of 4.5 and only a trace of formaldehyde odor. Experiments showed that the sodium bisulphite could be added at any stage up to and including the admixture of aminoplast composition with water without any significant change in the final result.

This glue remained smooth and spread well throughout the usual period of use (about two hours) and made entirely satisfactory plywood, both from hard and soft woods, by the usual hot press procedure.

Experimental adjustment of the pH of this bisulphite resin glue demonstrated impractical instability of the glue as a low pH of 2.5 was approached and undesirable slow-setting as an upper limit of pH 6.0 was approached. Around the median point of pH 4.25, considerable latitude for pH adjustment was permissible with satisfactory stability and reactivity. In general, lowering the pH increases the reactivity and decreases the glue life.

Experiments with numerous other wheat flours produced equally satisfactory results with merely minor variations in water requirement due to inherent variations in the individual flours.

A duplicate mix with the bisulphite omitted had considerable formaldehyde odor, became unspreadable, and curdled within a few minutes after mixing. It also required either a large reduction in the wheat flour component or an increase in the water component to obtain the correct initial viscosity.

Example II

The following materials were compounded as in Example I:

300 parts of dimethylol urea (previously dried and ground to a fine powder)
600 parts flour
6 parts sodium bisulphite
1 part oxalic acid
760 parts water This composition produced a smooth odorless glue which spread well and was free from curdy characteristics. The pH was 5.1. Since dimethylol urea is substantially insoluble in water at room temperature, it is to be noted that this composition, as spread, comprises an aqueous suspension of fine particles of dimethylol urea which has been thickened and rendered viscous and spreadable by admixture with the wheat flour in the presence of a substantial amount of bisulphite ions. Satisfactory glue bonds were obtained on both hard and soft woods by the usual hot press procedure. Subsequent experiments indicated that reducing the pH to a lower value of about 4.2 rendered the glue more quick-setting and slightly improved the bonds.

Dimethylol urea is usually sold in a particle size far too coarse to produce a smooth adhesive. I find that the drying and grinding can be avoided by first dissolving the dimethylol urea in a part of the water heated to about 180° F., then adding the remainder of the water and the flour and sodium bisulphite. During the cooling, the dissolved dimethylol urea is precipitated in very fine particles which produce a smooth mixture. Another method is to make up the glue with the coarse material in the usual way and then pass the glue several times through a close-fitting gear pump which action soon produces a smooth adhesive. Some glue mixers and spreaders are provided with a gear pump so that this is sometimes a practical procedure.

Fine-ground dimethylol urea may also be mixed with about an equal weight of flour along with about 2% of sodium bisulphite. This mixture can be sold as an adhesive base which can be further diluted at the glue plant with additional flour as desired and, when mixed with water, will produce a very economical smooth-spreading adhesive, regardless of the character of the wheat flour which is used.

Example III

The following ingredients were mixed in a similar manner to Example I:

150 parts urea
375 parts Formalin
500 parts flour
10 parts sodium bisulphite
3 parts oxalic acid
350 parts water.

This composition produced a smooth glue which spread well and did not develop a curdy character notwithstanding the large amount of free formaldehyde available from the Formalin. The pH was 4.2, the lower pH being obtained by the addition of the oxalic acid which was desirable to accelerate both the formation and conversion of a urea resin "in situ" on the plies in the hot press. It is noted that the composition, as spread, comprised a urea resin-forming reaction mixture which had been thickened and rendered viscous and spreadable by the admixture with the wheat flour in the presence of bisulphite ions. A similar composition, using this or any high gluten-strength wheat flour as the extender with the sodium bisulphite omitted, requires considerably more dilution with water to obtain initial spreadability and soon after mixing becomes unspreadable due to the development of a curdy character.

Although a urea resin reaction mixture thickened with burst starch has previously been proposed, it has not been very economical as a plywood adhesive because of the high water requirement of the burst starch and the inconvenience and cost of its preparation. The adhesive of this example avoids these difficulties, successfully employing the much less expensive wheat flour as an extender without the bursting process and produces very satisfactory plywood, with both hard and soft woods, at a very low cost. The only disadvantage found was the strong odor of formaldehyde from the free Formalin during the spreading and pressing. However, this disadvantage is easily remedied by the installation of an efficient ventilating system, the cost of which is soon repaid by the extremely low cost of the adhesive.

Some soft winter wheat flours and other wheat flours of weak gluten character may be mixed in compositions of this type and retain spreadability without the development of the objectionable curdy character. In such instances, a fairly satisfactory flour-extended, urea/formaldehyde reaction mixture adhesive is obtained. However, the cost of sodium bisulphite is so low as to be negligible and it makes all flours produce spreadable mixtures with equal satisfaction. It has the further advantage with all types of flour of materially reducing the water-requirement and permitting a consequent greater extension of the adhesive with wheat flour with accompanying cost reduction.

In this type of adhesive, it is also feasible to prepare and sell as an adhesive base a premix of the urea and part of the wheat flour with all of the sodium bisulphite. In the glue plant, the glue is mixed with additional flour as desired along with the Formalin and water, thus providing a spreadable adhesive regardless of the character of the wheat flour.

Example IV

The following ingredients were mixed as in Example I:

208 parts dry adhesive mixture containing 200 parts dry powdered melamine formaldehyde adhesive resin and 8 parts sodium bisulphite
400 parts flour
630 parts water This mixture gave a smooth, non-curdy glue with a pH of 5.5 and produced satisfactory results with the usual high degree of both cold and hot water resistance characteristic of melamine resins. A lower pH of about 4.2 was later found to produce slightly better results. A similar glue with the bisulphite omitted required objectionably increased water content to obtain a spreadable consistency and the glue soon curdled.

Example V

The following ingredients were compounded as in Example I:

90 parts melamine (fine powdered)
225 parts Formalin 300 parts flour
6 parts sodium bisulphite
4 parts oxalic acid
335 parts water The mixture produced a smooth, non-curdy glue with a pH of 5.5 and produced results similar to those of the preceding example but at substantially reduced cost. The resistance of the plywood to hot water was exceptionally high. A glue without the bisulphite required more water and soon curdled.

Subsequent investigation indicated even better results when the pH of this example was reduced to about pH 4.2 by the use of more acid.

It is believed that this is the first successful reaction mixture glue made with melamine and employing a thickened reaction mixture as the applied adhesive and obtaining satisfactory conversion "in situ" during hot pressing.

The problem of formaldehyde fumes would be solved by installing a ventilating system as in Example III.

The melamine, all the bisulphite and part of the flour may also be sold and used as a premix with the additional elements, including a variable amount of flour, added at the plywood plant to make the final glue which will spread satisfactorily due to the presence of the bisulphite.

Example VI

The following ingredients were mixed as in Example I:

60 parts urea
60 parts melamine
300 parts Formalin
400 parts flour
12 parts sodium bisulphite
5 parts oxalic acid
425 parts water This composition gave a smooth glue with a pH of 5.5 and produced results combining the usual properties of urea and melamine adhesives. Later, a lower pH range of about 4.2 proved preferable.

This adhesive may also be sold as a premix as in the previous example.

Both melamine and soluble blood albumen have the desirable property of imparting hot water resistance to plywood adhesives. In this and the preceding examples, it is sometimes more economical to obtain this property by the use of blood instead of melamine and the substitution of up to about 25% of the resin elements by blood albumen is feasible and often desirable. This can be done without any sacrifice of the desirable properties obtained by bisulphite action on the wheat flour extender.

The present invention provides a procedure for the modification of common adhesive compositions of the convertable, amino-aldehyde type whereby these compositions may be mixed with wheat flours, which may be of any type as to strength or character of gluten and the total mixture then may be mixed with aqueous media composed preponderately of water in order to form spreadable glues without the appearance of any curdiness or thixotropicity in the aqueous mixture. Thus, the invention provides amino-aldehyde type glue-bases which may be employed by a user extended with liberal quantities of wheat flour without regard for the source or character of the flour. This is an important contribution to the art because hitherto it has been necessary to test available flours, and if possible, select one which is free from curd-forming tendencies. Thus, this invention removes the necessity for preliminary flour testing and assures satisfactory spreadability and bonding of amino-aldehyde adhesives extended with flour.

I claim:

1. The method of making a viscous, smooth-spreading, aqueous, wheat flour-extended, dimethylol urea adhesive which comprises the steps of suspending fine-powdered particles of dimethylol urea in an aqueous suspension of wheat flour having an acid pH together with a solution of sodium bisulphite provided in an amount equal to about 1 to 6 per cent based upon the weight of said wheat flour.

2. The method of making a viscous, smooth-spreading, aqueous, wheat flour-extended, dimethylol urea adhesive which comprises the steps of dissolving the dimethylol urea in hot water, then adding wheat flour and an amount of sodium bisulphite equal to about 1 to 6 per cent based on the weight of the wheat flour, then continuing stirring of the mixture and allowing it to cool to room temperature so as to re-precipitate the dissolved dimethylol urea in fine particles and form a viscous, spreadable, non-thixotropic extended adhesive.

3. The method of making a viscous, smooth-spreading, aqueous, wheat flour-extended, dimethylol urea adhesive which comprises mixing water, coarse particles of dimethylol urea, wheat flour and an amount of sodium bisulphite equal to about 1 to 6 per cent based on the weight of the wheat flour, and subjecting the mixture to a grinding action whereby the dimethylol urea is reduced to fine particles and a smooth-spreading, non-curding adhesive is provided.

4. An aqueous, liquid, wheat-flour-extended adhesive comprising a composition from the group consisting of urea/formaldehyde and melamine/formaldehyde condensation products and sodium bisulphite in concentration of about 1 to 6 per cent based upon the weight of the wheat flour, said adhesive having a pH of between about 2.5 to 6.0.

5. An aqueous, liquid, wheat-flour-extended adhesive having a pH between about 2.5 to 6.0 comprising a mutual suspension of wheat flour, a composition from the group consisting of urea/formaldehyde and melamine/formaldehyde condensation products, and sodium bisulphite in a concentration of about 1 to 6 per cent based upon the weight of the wheat flour.

6. An aqueous, liquid, wheat-flour-extended adhesive having a pH between about 2.5 to 6.0 comprising a mutual suspension of wheat flour, finely comminuted dimethylol urea and sodium bisulphite in a concentration of about 1 to 6 per cent based upon the weight of the wheat flour.

7. An aqueous, liquid, wheat-flour-extended adhesive having a pH between about 2.5 to 6.0 comprising a mutual suspension of wheat flour, finely comminuted urea/formaldehyde condensation product and sodium bisulphite in a concentration of about 1 to 6 per cent based on the weight of the wheat flour.

8. An aqueous, liquid, wheat-flour-extended adhesive having a pH between about 2.5 to 6.0 comprising a mutual suspension of wheat flour, finely comminuted melamine/formaldehyde resin and sodium bisulphite in a concentration of about 1 to 6 per cent based upon the weight of the wheat flour condensation product.

9. A dry glue base which upon admixture with water forms a viscous, liquid adhesive mixture having a pH between about 2.5 to 6.0 which comprises a composition from the group consisting of urea/formaldehyde and melamine/formaldehyde condensation products, wheat flour, and a water soluble bisulphite in a concentration of about 1 to 6 per cent based on the weight of the wheat flour.

10. The glue base of claim 9 wherein said composition is a urea/formaldehyde condensation product and wherein the bisulphite is sodium bisulphite.

11. The glue base of claim 9 wherein said composition is a melamine/formaldehyde condensation product and wherein the bisulphite is sodium bisulphite.

12. The glue base of claim 9 wherein said composition is finely comminuted dimethylol urea and wherein the bisulphite is sodium bisulphite.

13. In the process of making a viscous smooth-spreading, aqueous, wheat-flour-extended, adhesive comprising a composition from the group consisting of urea/formaldehyde and melamine/formaldehyde condensation products, the step which comprises incorporating in the adhesive having a pH between about 2.5 and 6.0 sodium bisulphite in a concentration of 1 to 6 per cent based upon the weight of the wheat flour.

14. An aqueous liquid adhesive comprising wheat flour, a condensation product from the group consisting of urea/formaldehyde and melamine/formaldehyde condensation products and a water soluble bisulfite in concentration of about 1 to 6 per cent based upon the weight of said wheat flour, said adhesive having a pH of between about 2.5 to 6.0.

15. In the process of making a viscous, smooth-spreading aqueous adhesive comprising wheat flour and a condensation product from the group consisting of urea/formaldehyde and melamine/formaldehyde condensation products, the step which comprises incorporating in the adhesive having a pH between about 2.5 and 6.0, a water soluble bisulfite in concentration of 1 to 6 per cent based upon the weight of said wheat flour.

CLARENCE F. VAN EPPS.

REFERENCES CITED

The following references are of record in the file of this patent:

UNITED STATES PATENTS

| Number | Name | Date |
| --- | --- | --- |
| 2,019,834 | Vierling | Nov. 5, 1935 |
| 2,321,451 | Bauer | June 8, 1943 |
| 2,322,887 | Schwartz | June 29, 1943 |
| 2,325,105 | Bruson | July 27, 1943 |
| 2,345,543 | Wohnsiedler | Mar. 28, 1944 |
| 2,388,143 | Harris | Oct. 30, 1945 |
| 2,407,225 | Dixon | Sept. 10, 1946 |
| 2,407,599 | Duter | Sept. 10, 1946 |

FOREIGN PATENTS

| Number | Country | Date |
| --- | --- | --- |
| 476,608 | Great Britain | Dec. 13, 1937 |

Certificate of Correction

Patent No. 2,492,510 December 27, 1949

CLARENCE F. VAN EPPS

It is hereby certified that errors appear in the printed specification of the above numbered patent requiring correction as follows:

Column 8, line 70, for the word "resin" read *condensation product*; line 73, strike out "condensation product";

and that the said Letters Patent should be read with these corrections therein that the same may conform to the record of the case in the Patent Office.

Signed and sealed this 16th day of May, A. D. 1950.

[SEAL]

THOMAS F. MURPHY,
*Assistant Commissioner of Patents.*